United States Patent
Ostlund

(10) Patent No.: US 8,943,531 B2
(45) Date of Patent: *Jan. 27, 2015

(54) INCREASING PAY-PER-USE CREDIT ASSOCIATED WITH GUEST ROOM IN RESPONSE TO NOTIFICATION MESSAGE TRACKING USAGE OF SERVICE OFFERED BY HOSPITALITY ESTABLISHMENT

(71) Applicant: Guest Tek Interactive Entertainment Ltd., Calgary (CA)

(72) Inventor: Gavin Ostlund, Calgary (CA)

(73) Assignee: Guest Tek Interactive Entertainment Ltd., Calgary (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/309,022

(22) Filed: Jun. 19, 2014

(65) Prior Publication Data

US 2014/0304722 A1    Oct. 9, 2014

Related U.S. Application Data

(63) Continuation of application No. 13/972,671, filed on Aug. 21, 2013, now Pat. No. 8,763,025, which is a continuation of application No. 13/220,912, filed on Aug. 30, 2011, now Pat. No. 8,566,883.

(51) Int. Cl.
    *H04N 7/16* (2011.01)
    *H04N 21/214* (2011.01)
    *H04N 21/2543* (2011.01)
    *H04N 21/472* (2011.01)

(52) U.S. Cl.
    CPC ....... *H04N 21/2143* (2013.01); *H04N 21/2543* (2013.01); *H04N 21/47211* (2013.01)
    USPC .............. 725/23; 725/5; 725/6; 725/7; 725/8; 725/78; 725/83; 725/87; 725/104; 705/14.1; 705/14.12; 705/14.36

(58) Field of Classification Search
    CPC .......... H04N 21/2543; H04N 21/4784; H04N 21/2142; H04N 21/47211; H04N 7/162–7/163; H04N 7/106; G06Q 30/0207; G06Q 30/0209; G06Q 30/0236
    USPC ......... 725/5–8, 23, 78, 83, 87, 104; 705/14.1, 705/14.12, 14.36
    See application file for complete search history.

(56) References Cited

U.S. PATENT DOCUMENTS

| | | | |
|---|---|---|---|
| 7,083,520 B2 * | 8/2006 | Rowe | 463/42 |
| 8,566,883 B2 | 10/2013 | Ostlund | |
| 8,763,025 B2 | 6/2014 | Ostlund | |
| 2005/0283791 A1 * | 12/2005 | McCarthy et al. | 725/1 |
| 2009/0177594 A1 * | 7/2009 | Williams, Jr. | 705/412 |

* cited by examiner

*Primary Examiner* — Yassin Alata
(74) *Attorney, Agent, or Firm* — ATMAC Patent Services Ltd.; Andrew T. MacMillan

(57) ABSTRACT

A hospitality establishment includes guest rooms having media devices installed therein. Each guest room has one or more in-room media devices for providing a pay-per-use media function. A media system controller dynamically associates a credit corresponding to a monetary value with a particular guest room in response to an occurrence of a first event, configures an in-room media device of the particular guest room to indicate the credit associated with the particular guest room and allow a guest of the particular guest room to utilize at least an amount of the credit toward an order of the pay-per-use media function, activates the pay-per-use media function on at least one of the in-room media devices of the particular guest room in response to a received order, and decreases the credit associated with the particular guest room according to the amount of the credit utilized toward the received order.

20 Claims, 8 Drawing Sheets

─114

Example room credit table

| Room identifier | Periodic credit increase | Next periodic credit add time | Current credit |
|---|---|---|---|
| 101 | $3.00 | 2011/06/01 14:56 | $7.99 |
| 103 | $3.00 | 2011/06/01 17:10 | $3.00 |
| 105 | $12.99 | 2011/06/01 21:00 | $14.00 |
| 107 | 0 | N/A | 0 |
| ⋮ | ⋮ | ⋮ | ⋮ |

Example PMS credit events table

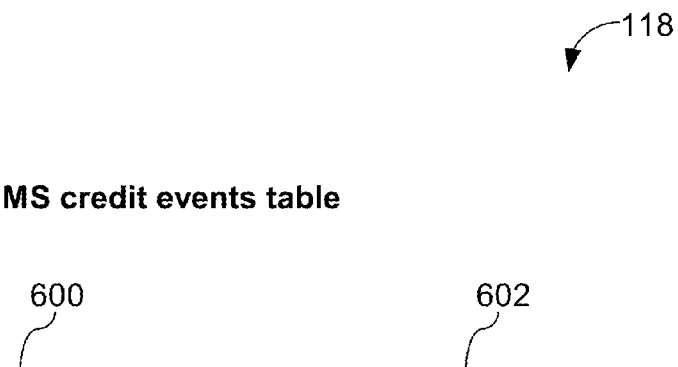

| PMS message code | Description of service utilized or declined | Credit increase |
|---|---|---|
| Spa-booking-1 | Guest purchases basic spa package | $5.00 |
| Spa-booking-2 | Guest purchases deluxe spa package | $12.99 |
| Room-service-ordered | Guest orders room service | $2.00 |
| Sheet-exchange-declined | Guest declined laundry service for previous night | $1.50 |
| Towel-exchange-declined | Guest declined towel exchange for previous night | $1.50 |
| Complimentary-breakfast-declined | Guest did not attend complimentary breakfast | $1.50 |
| ⋮ | ⋮ | ⋮ |

FIG. 6

Example pay-per-use history table

INCREASING PAY-PER-USE CREDIT ASSOCIATED WITH GUEST ROOM IN RESPONSE TO NOTIFICATION MESSAGE TRACKING USAGE OF SERVICE OFFERED BY HOSPITALITY ESTABLISHMENT

CROSS-REFERENCE TO RELATED APPLICATIONS

This application is a continuation of U.S. patent application Ser. No. 13/972,671 filed Aug. 21, 2013, which is a continuation of U.S. patent application Ser. No. 13/220,912 filed Aug. 30, 2011. Both of these applications are incorporated herein by reference.

BACKGROUND OF THE INVENTION (1) Field of the Invention

The invention pertains generally to hospitality media and entertainment systems. More particularly, the invention relates to hospitality media systems that provide pay-per-use media functions in guest rooms of a hospitality establishment.

(2) Description of the Related Art

Free-to-guest entertainment media content such as television within guest rooms is generally provided by hospitality establishments such as hotels to meet guests' basic in-room entertainment expectations. For example, a hotel may purchase rights to distribute cable and/or satellite television channels to the guest rooms. Rights to satellite radio content or other multi-media content may also be purchased by the hotel and made available in the guest rooms.

Although free-to-guest entertainment options are well received by guests, the hotel does incur costs to provide these services and therefore there are limits on the amount of in-room content that can be provided for free. If a hotel wishes to provide increased free media content options to guests, the hotel must either incur the additional licensing costs, or raise room rates or other service fees to cover the additional licensing costs.

Pay-per-use systems have also been developed for use in hotels including, for example, pay-per-view (PPV) for live sporting events and video-on-demand (VOD) for feature Hollywood movies. In addition to allowing hotels to provide highly desirable content for guest viewing, pay-per-use often becomes a secondary revenue stream for the hotel. The reason is the hotel may add an additional, hidden fee onto the royalty cost of the content. For example, each time a guest pays $11.99 to watch an in-room VOD movie, the hotel may keep $5.99 as profit and pay a $6.00 royalty to the content provider. Pay-per-use systems are generally more expensive for the hotel to install and support than free-to-guest offerings due to the interactive nature and requirement to bill guests in real time.

Although pay-per-use systems are routinely used by some guests, the same systems are often shunned by other guests who have an aversion to additional in-room usage fees. The result is that a hotel makes a considerable investment to install a pay-per-use system while a significant number of the hotel's guests do not utilize the pay-per-use media functions and therefore see no initial direct benefit. Over time the increased revenue from the pay-per-use system may allow the hotel to expand its free-to-guest offerings; however, in the short term, the opposite may be true—that is, the hotel may need to avoid expanding or even reduce the free-to-guest offerings in order to lessen the installation and reoccurring support costs of the pay-per-use system. This further detracts from the experience of guests who are not interested in trying out the pay-per-use system because of the additional usage fees.

BRIEF SUMMARY OF THE INVENTION

According to an exemplary embodiment of the invention there is disclosed a system for use at a hospitality establishment having a plurality of guest rooms. The system includes a plurality of devices for installation in the guest rooms such that each guest room has one or more in-room devices for providing functions therein, the functions including at least a pay-per-use function. The system further includes a system controller for performing data communications with the devices and operable to dynamically associate a credit corresponding to a monetary value with a particular guest room in response to a guest checking in to the particular guest room. The system controller is further operable to dynamically increase the credit associated with the particular guest room in response to receiving a notification message tracking usage of a service offered at the hospitality establishment with respect to the particular guest room. The system controller is further operable to configure an in-room device of the particular guest room to indicate the credit associated with the particular guest room and allow the guest of the particular guest room to utilize at least an amount of the credit toward an order of the pay-per-use function. The system controller is further operable to activate the pay-per-use function on at least one of the in-room devices of the particular guest room in response to a received order, and decrease the credit associated with the particular guest room according to the amount of the credit utilized toward the received order.

According to another exemplary embodiment of the invention there is disclosed a method of controlling a plurality of devices at a hospitality establishment having a plurality of guest rooms. Each guest room has one or more in-room devices for providing functions therein. The functions include at least a pay-per-use function. The method includes dynamically associating a credit corresponding to a monetary value with a particular guest room in response to a guest checking in to the particular guest room, and dynamically increasing the credit associated with the particular guest room in response to receiving a notification message tracking usage of a service offered at the hospitality establishment with respect to the particular guest room. The method further includes configuring an in-room device of the particular guest room to indicate the credit associated with the particular guest room, allowing the guest of the particular guest room to utilize at least an amount of the credit toward an order of the pay-per-use function, activating the pay-per-use function on at least one of the in-room devices of the particular guest room in response to a received order, and decreasing the credit associated with the particular guest room according to the amount of the credit utilized toward the received order.

According to another exemplary embodiment of the invention there is disclosed a system controller for controlling a plurality of devices at a hospitality establishment having a plurality of guest rooms. Each guest room has one or more in-room devices for providing functions therein. The functions include at least a pay-per-use function. The system controller includes one or more processors configured to dynamically associate a credit corresponding to a monetary value with a particular guest room in response to a guest checking in to the particular guest room, and dynamically increase the credit associated with the particular guest room in response to receiving a notification message tracking usage of a service offered at the hospitality establishment with respect to the particular guest room. The one or more processors are further configured to configure an in-room device of the particular guest room to indicate the credit associated with the particular guest room, and allow the guest of the particular guest room to utilize at least an amount of the credit toward an order of the pay-per-use function. The one or more processors are further configured to activate the pay-per-use function on at least one of the in-room devices of the particular room in response to a received order, and decrease the credit associated with the particular guest room according to the amount of the credit utilized toward the received order.

According to an exemplary embodiment of the invention the notification message indicates that a complimentary service such as towel exchange or breakfast offered at the hospitality establishment was declined for the particular guest room.

According another exemplary embodiment of the invention the notification message indicates that a profit generating service such as room service or a spa package offered at the hospitality establishment has been billed to the particular guest room.

These and other embodiments and advantages of the invention will become apparent from the following detailed description, taken in conjunction with the accompanying drawings, illustrating by way of example the principles of the invention.

BRIEF DESCRIPTION OF THE DRAWINGS

The invention will be described in greater detail with reference to the accompanying drawings which represent preferred embodiments thereof.

FIG. 3 is an example of the room credit table of FIG. 1 utilized to allow the media system controller to associate a room-specific credit with each of the guest rooms of the hospitality establishment.

FIG. 6 illustrates an example of the PMS credit events table of FIG. 1 showing sample PMS notification messages that correspond to credit increase events.

DETAILED DESCRIPTION

Figure 1:
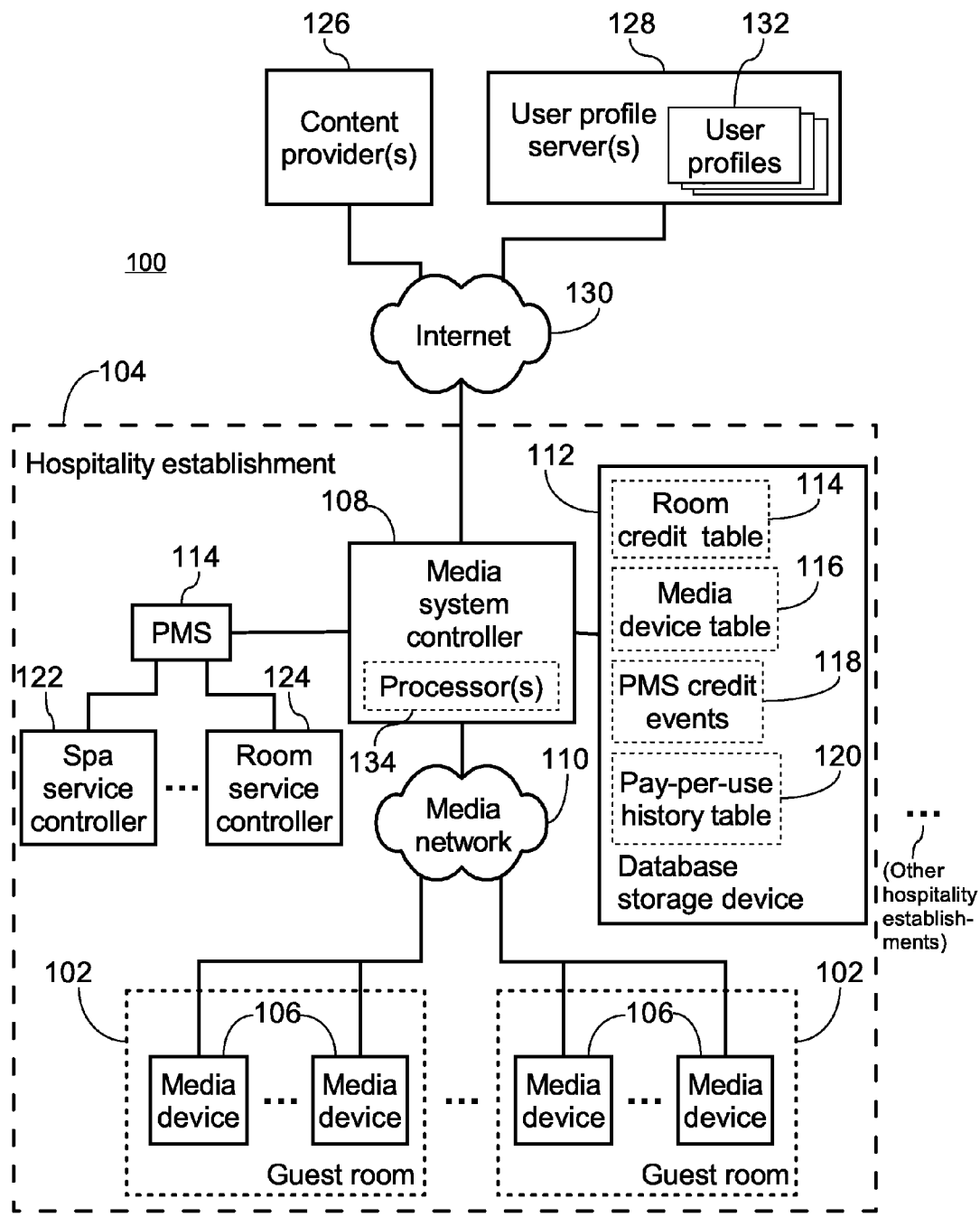
FIG. 1 is a block diagram of a media system for providing media functions in guest rooms of a hospitality establishment according to an exemplary configuration of the invention.

FIG. 1 is a block diagram of a media system 100 for providing media functions in guest rooms 102 of a hospitality establishment 104 according to an exemplary configuration of the invention. In this configuration, the hospitality establishment 104 is a lodging establishment such as a hotel or resort having a plurality of media devices 106 installed in various guest rooms 102. Examples of the media devices 106 include set-top boxes (STBs), televisions (TVs), other display screens such as projectors, room control boxes that provide effects in the guest rooms 102 such as special ambient lighting and dynamic temperature control, speakers and other audio systems, video gaming consoles, and gambling machines and casino games. Other types of media devices 106 may also be used in other configurations.

Each guest room 102 has one or more media devices 106 installed therein, and the media devices 106 are coupled to a media system controller 108 through a media network 110 such as a wired or wireless local area network (LAN) installed at the hotel.

In-room media functions provided by the media devices 106 at least include a pay-per-use media function, for example, pay-per-view (PPV) of live events, video-on-demand (VOD) of Hollywood movies, and/or pay-per-play (PPP) of video and/or casino games. Although VOD and PPP are utilized to illustrate advantageous features of the invention in the following description, other types of pay-per-use media functions may also be utilized in conjunction with the invention according to the specific requirements and/or target guests of the hospitality establishment 104.

As shown in FIG. 1, the media system 100 further includes a database storage device 112 and a property management system (PMS) 114 both coupled to the media system controller 108. The database storage device 112 stores tables of a database that is a structured set of data utilized by the media system controller 108 including a room credit table 114, a media device table 116, a PMS credit events table 118, and a pay-per-use history table 120. The PMS 114 processes messages received by controllers of guest service systems at the hospitality establishment 104 such as, in this example, a spa service controller 122 and a room service controller 124, and sends corresponding notification messages to the media system controller 108.

In this example one or more external content providers 126 and user profile servers 128 are coupled to the media system controller 108 via a wide area network such as the Internet 130. Each content provider 126 provides content to the hospitality establishment 104 such as by streaming media assets to the media system controller 108, and each user profile server 128 stores a number of user profiles 132 having preferences and settings of different users such as may be tracked in a customer loyalty program.

Figure 2:
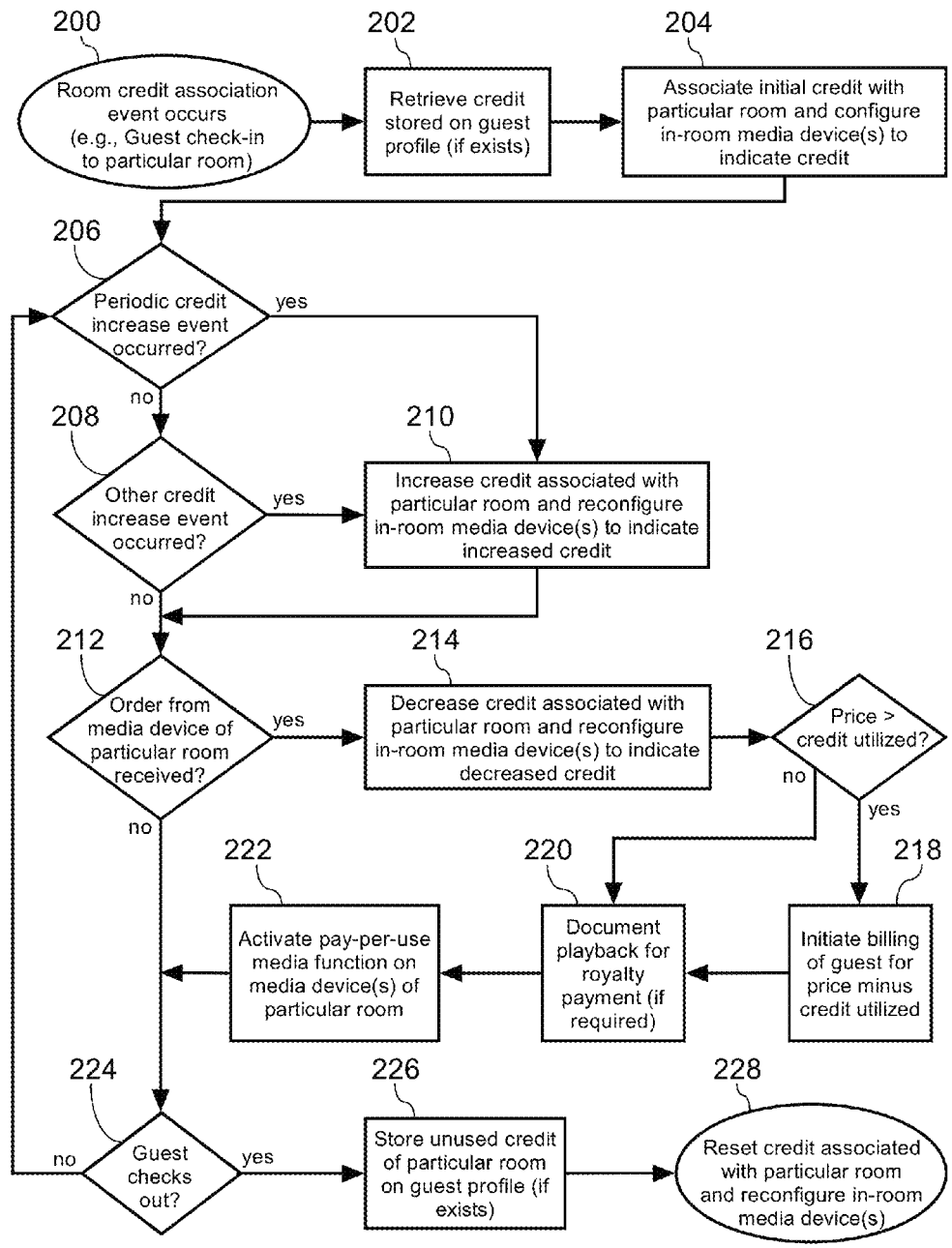
FIG. 2 is a flowchart describing exemplary operations performed by the media system controller of FIG. 1 when controlling the media devices in the various guest rooms of the hospitality establishment.

FIG. 2 is a flowchart describing exemplary operations performed by the media system controller 108 of FIG. 1 when controlling the media devices 106 in the various guest rooms 102. In this configuration, the media system controller 108 is implemented as a computer server and includes one or more processors 134 configured to operate pursuant to software instructions (not shown) to perform communications with and control the media devices 106 according to the process described by the flowchart of FIG. 2. The steps of the flowchart are not restricted to the exact order shown, and, in other configurations, shown steps may be omitted or other intermediate steps added.

The process begins at step 200 in response to an occurrence of a first event such as a new guest checking in to a particular guest room 102 of the hospitality establishment 104. The process may begin in response to other types of first events such as when a new guest of a room logs into or begins utilizing a media device 104, purchases credit on an in-room media device 104, or when a guest changes from a first room 102 to a second, different room 102, for example. Taking room check-in as an example, upon the guest checking in to the particular guest room 102, the media system controller 108 retrieves, at step 202, a user profile 132 corresponding to the guest from the user profile server 128 and associates, at step 204, an initial credit at least including any credit stored on the user profile 132 with the particular room 102 in which the guest has checked in.

The media system controller 108 may correlate the identity of the guest with the guest's corresponding user profile 132 according to a user identifier such as the guest's name, user number, login or sign-on credentials, loyalty program number, or other information. For example, the user identification information may be received from the guest during a reservation process, may be recorded by front desk staff during the check-in process, or may be automatically detected or received by the media system controller 108 or another component of the media system 100 when the guest begins utilizing one of the media devices 106 the particular guest room 102.

As will be further described below, in an advantageous configuration, the initial credit associated with the particular guest room 102 is actually increased by the media system controller 109 so that it is greater than the credit stored on the user profile 132. In this way, the guest's stored credit may gradually build up each time they check into a hospitality establishment 104 participating in a loyalty program offered by the user profile server 128.

FIG. 3 is an example of the room credit table 144 of FIG. 1 utilized to allow the media system controller 108 to associate a room-specific credit with each of the guest rooms 102 of the hospitality establishment 104. In this example, room credit table 144 includes the following columns:

Column 300—Room identifier: Stores a room identifier (ID). In this example, each of the guest rooms 102 of the hotel has an ID number being the room number; however, other types of room identifier's may also be utilized in other configurations such as a unique label or name of the room, or an indication of the room's location such as floor number and room position, for example.

Column 302—Periodic credit increase: Stores a credit entitlement to be periodically added to the room identified by column 300 of the same row. In this example, the credit associated with each room is increased daily as long as the guest stays checked in, and the amount of the increase depends upon either a category of the room 102 or a category of the guest checked in to the room 102. By changing the values in column 302, the media system controller 108 may adjust the amount of the daily credit entitlement for each room accordingly. For example, a guest room 102 corresponding to a presidential suite may be entitled to a higher periodic credit increase than a budget guest room 102. Likewise, a guest who is a member of a VIP loyalty program staying in a particular room 102 may be entitled to a higher periodic credit increase than a subsequent guest who is not a member of the VIP loyalty program staying in the same room 102. In another example, the periodic credit increase may be higher for certain rooms 102 in order to compensate these rooms for noise or other disturbances of ongoing repairs. The credit increase values of column 302 may also be increased and decreased globally across all rooms such as when the hotel management wants to offer larger periodic credit increase during the off season, for example.

Column 304—Next periodic credit add time: Stores a date/time value indicating when the next periodic credit increase of column 302 should be applied for each room. In this example, the daily credit increase occurs every twenty-four hours after the time the guest checked in to the particular guest room 102. A benefit of tying the periodic credit add time to the guest's actual check-in time is to avoid double periodic increases during a single period, which may occur if the periodic increase for all rooms occurs at a designated time such as midnight. An advantage of each room having its own next periodic credit add time value in column 304 is that it allows the credit increase period for each room to be individually adjusted. For example, certain types of rooms 102 may have credit increases applied hourly whereas other types of rooms 102 may have credit increases applied daily.

Column 306—Current credit: Stores the amount of credit currently associated with the guest room 102 identified by column 300 of the same row.

Continuing the description of step 204 of FIG. 2, the media system controller 108 may firstly find the row having the room identifier of the particular room 102 in which the guest has just checked in, and then adjust the "Current credit" value of column 306 of the same row to be the sum of the stored credit on the guest's user profile 132 and the periodic credit increase amount specified on column 302 according to the room type. In this way, when a new guest checks in to the hospitality establishment 104, the guest's registered room 102 is associated with a current credit being the particular room's daily credit entitlement plus any saved credit on the guest's personal guest profile 132. Should the guest not have a user profile 132 or should the guest's user profile 132 have no saved credit, the guest's registered room 102 receives a current credit being only the particular room's daily credit entitlement. In this way, the guest's saved credit is allowed to build up simply by checking in to an additional hospitality establishment 104. This is beneficial to encourage the guest to select hospitality establishments 104 participating in a same loyalty program offered by the user profile server 128, for example.

After associating the credit with the particular guest room 102, the media system controller 108 configures at least one of the in-room media devices 106 of the particular guest room 102 to indicate the credit currently associated with the particular guest room 102 and to allow the guest of the particular guest room 102 to utilize at least an amount of the credit toward an order of a pay-per-use media function provided by the media devices 106 of the particular room 102.

Only one of the media devices 106 of the particular guest room 102 may need to be configured such as an in-room STB that acts as a control point within the particular guest 102 room. Alternatively, multiple media devices 106 of the particular guest room 102 may be configured at step 204 such as both an in-room STB and a gaming console. In this way, the guest staying in the particular room 102 may utilize the credit associated with the particular room toward both pay-per-use VOD and PPP media functions.

To perform the configuration, the media system controller 108 may look-up in a database which media devices 106 provide pay-per-use media functions in the particular guest room 102 and then send configuration commands to these media devices 106 via the media network 110.

Figure 4:
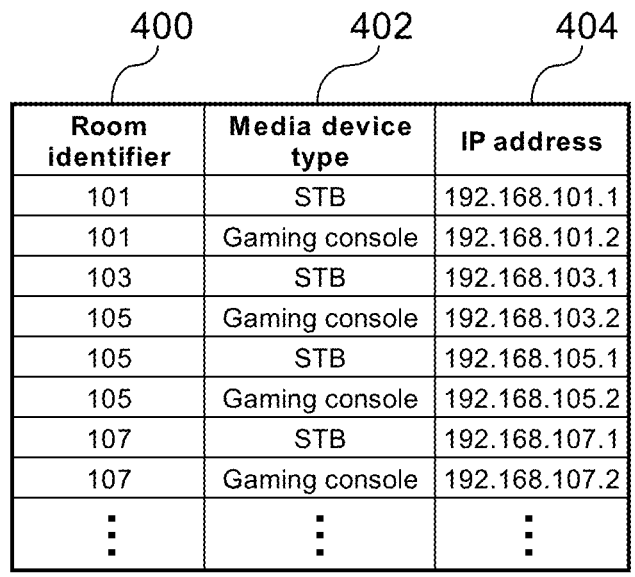
FIG. 4 is an example of the media device table of FIG. 1 allowing the media system controller to determine network addresses of the media devices of the particular room needing to be configured.

FIG. 4 is an example of the media device table 116 of FIG. 1 allowing the media system controller 108 to determine network addresses of the media devices 106 of the particular room 102 needing to be configured. The media device table 116 in this example includes the following columns:

Column 400—Room number: Stores a room identifier (ID) similar to as described above for column 300 of FIG. 3.

Column 402—Media device type: Stores a type of the media device 106 to which the row pertains. In this example STBs and gaming consoles are illustrated; however, room and network address information other types of media devices 106 may also be stored in table 116 in a similar fashion.

Column 404—IP address: Stores the private internet protocol (IP) address of the media device 106 in the guest room 102 to which the row pertains.

In an example usage of tables 114 and 116 at step 204, in response to an occurrence of first event such as when a new guest checks in to room #101 (e.g., having room identifier "101"), the media system controller 108 updates the room credit table 114 so the "Current credit" column 304 for room #101 associates the guest's total credit ($7.99 in this example) with room #101 and updates the next periodic credit add time column 306 for room #101 to be twenty-four hours after the guest's check-in time (next credit to be added at "2011 Jun. 01, 14:56" in this example). The controller 108 then sends configuration commands to the IP addresses of the STB and gaming console in room #101 as looked-up in media device table 116. The configuration commands cause the STB and gaming console in room #101 to indicate the current credit ($7.99) associated with room #101 and to allow the guest of room #101 to utilize at least an amount of the credit toward an order of a pay-per-use function provided by these media devices.

Figure 5:
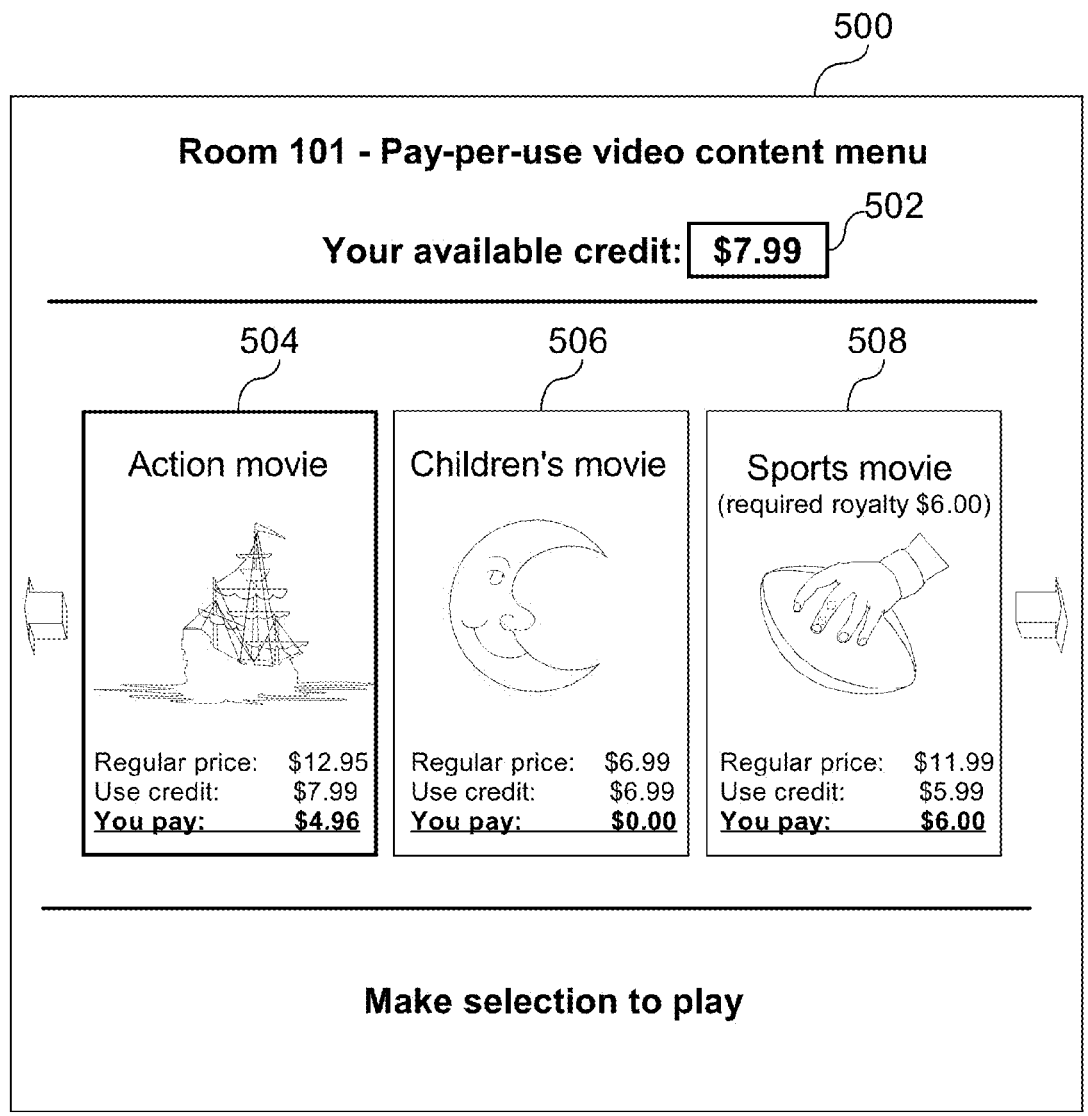
FIG. 5 is a user interface (UI) screen as presented by an in-room STB indicating the credit associated with the particular guest room and allowing the guest to utilize at least an amount of the credit toward a pay-per-use video-on-demand (VOD) order according to an exemplary configuration of the invention.

FIG. 5 is a user interface (UI) screen 500 as presented by an in-room STB indicating the credit associated with the particular guest room 102 ("Room #101" in this example) and allowing the guest to utilize at least an amount of the credit toward a pay-per-use VOD order according to an exemplary configuration of the invention.

As illustrated, the UI screen 500 includes an indication 502 of the credit currently associated with the guest room 102 in which the user is currently check in. The guest may select between three pay-per-use VOD movies 504, 506, 508 and the STB allows the guest to utilize at least an amount of the indicated credit 502 toward a movie order. For example, an action movie 504 has a regular price exceeding the room's associated credit and therefore the full amount of the indicated credit 502 may be utilized toward the order of the action movie 504. A children's movie 506 has a regular price being less than the room's associated credit and therefore only some of the room's credit needs to be utilized to cover the full price of the children's movie 506. A sports movie 508 has a required royalty amount ($6.00 in this example) that must be paid in full by the guest and therefore only a portion of the room's credit may be utilized toward the order of the sports movie 508. More details of limiting the amount of the credit that can be utilized according to required royalty payments of certain media assets is provided later in this description.

Continuing the description of the flowchart of FIG. 2, at steps 206 and 208 the media system controller 108 checks for an occurrence of a second event associated with the particular guest room 102.

In particular, at step 206, the media system controller 108 checks whether a periodic credit increase event for the particular guest room 102 has occurred. In an exemplary configuration, the periodic credit increase event automatically occurs once every predetermined time period while the guest remains checked in to the particular guest room 102. As previously described with respect to column 304 of FIG. 3, when the guest rooms 102 are registered to guests on a daily basis, the periodic credit increase event may be configured to automatically occur every twenty-four hours after the guest first checked in to the particular guest room 102. Other predetermined time periods such as every day at a designated time (e.g., at midnight) or with periods other than twenty-four hours may also be utilized in other configurations.

In order to check whether a periodic credit increase event for the particular guest room 102 has occurred at step 208, the media system controller 108 may search the room credit table 114 to determine if the value of the "Next period credit add time" column 403 on the row corresponding to the particular guest room 102 has exceeded the current date/time. When the periodic credit increase event for the particular guest room 102 has occurred, control proceeds to step 210; otherwise, control proceeds to step 208.

At step 208, the media system controller 108 checks whether any other credit increase events have occurred for the particular guest room 102. In this configuration, other credit increase events automatically occur in response to messages received from the PMS 114. For example, the PMS 114 may automatically send a notification message to the media system controller 108 when the guest of the particular guest room 102 utilizes (and/or declines to utilize) services offered at the hospitality establishment 104.

FIG. 6 illustrates an example of the PMS credit events table 118 of FIG. 1 showing sample PMS notification messages that correspond to credit increase events at step 208. The hospitality establishment 104 may already have an operating PMS 114 for tracking service usage; therefore, it may be easy and low cost for the media system controller 108 to receive notification messages from the PMS 114. The columns of the PMS credit events table 118 in this example include:

Column 500—PMS message code: Stores an identifier of the type of the PMS notification message. Although the code is illustrated as a short form descriptive phrase to facilitate understanding, in actual implementations the code may another type of PMS-message type identifier.

Column 502—Description of service utilized or declined: Stores a descriptive explanation of when the notification message will be sent by the PMS 114.

Column 504—Credit increase: Stores the amount of the credit increase that will be applied to the particular guest room 102 to which the PMS notification message pertains.

In this example, the first three message rows illustrate PMS message codes ("Spa-booking-1", "Spa-booking-2", and "Room-service-ordered") that are sent by the PMS 114 when the guest of one of the guest rooms 102 utilizes a service at the hospitality establishment 104. Each of these services are profit generating and therefore, in response to receiving one of these notification messages, the media system controller increases the credit associated with the guest's registered room by the amount indicated in the "Credit increase" column 604 on the corresponding row of table 118. Increasing the credit associated with the particular guest room 102 of a guest who has utilized a profit generating service offered at the hospitality establishment 104 is advantageous to both encourage guests to use these services and to reward guests when they do utilize these services.

For example, when a guest staying in room #101 purchases a deluxe spa package, the guest may indicate their particular guest room number (i.e., room #101) during the purchase process. The Spa service controller 122 then posts a room charge to bill the guest's room for the amount of the deluxe spa package, and the PMS 114 sends a notification message ("Spa-booking-2" in this example) to the media system controller 108. The result at step 208 of FIG. 2 is therefore affirmative and the media system controller 108 therefore proceeds to step 210 to increase the credit associated with room #101 by the amount indicated in the "Credit increase" column 604 ($12.99 in this example). The amount of the credit increase may be a percentage of the profit or revenue received by the hospitality establishment 104 for the use of the service.

The next three message rows of table 118 illustrate PMS message codes ("Sheet-exchange-declined", "Towel-exchange-declined", "Complimentary-breakfast-declined") that are sent by the PMS 114 when the guest of one of the guest rooms 102 declines to utilize a service at the hospitality establishment 104. In this example, although offered complimentary to the guest, each of these services are paid for by the hospitality establishment 104 such as labor and laundry costs of exchanging sheets and towels, and labor and food costs for providing the guest with a complimentary breakfast. By increasing the credit associated with the guest's registered room when the guest declines to utilize these complimentary services, the hospitality establishment 104 saves money that it would have otherwise (perhaps unnecessarily) spent. An advantage of this functionality is that guests are rewarded for reducing the costs of the hospitality establishment 104.

For example, when a guest staying in room #101 declines towel exchange such as by making a decline selection on a menu presented on the in-room STB or when room service personnel input information that the guest did not place the towels in the bathtub to signal they need to be exchanged, the room service controller 124 may thereafter post a notification message to the PMS 114 indicating that the towels were not changed in room #101. The PMS 114 then sends a corresponding notification message ("Towel-exchange-declined" in this example) to the media system controller 108 indicating room #101. The result at step 208 of FIG. 2 is therefore affirmative and the media system controller 108 proceeds to step 210 to increase the credit associated with room #101 by the amount indicated in the "Credit increase" column 604 ($1.50 in this example). This amount may be a percentage of the cost savings to the hospitality establishment 104 by not providing the service declined by the guest.

The media system controller 108 may also recognize other types of credit increase events at step 208. For example, when the guest in the particular guest room 102 orders a full priced movie without using any credit this may also constitute a credit increase event. In this way, guests are encouraged to order another movie afterwards in order to make use of the credit. Credit may also be added to the user as a percentage of the amount that was actually billed to the user when ordering a service at the hospitality establishment. In this way, the more services utilized and revenue received from a guest, the more credit that will be associated with the guest's particular guest room 102. The credit increase event detected at this step may also occur when a guest purchases an amount credit on an in-room media device 104.

Upon the occurrence of one of the above-described second events, at step 210 the media system controller 108 increases the credit associated with the particular guest room 102 and reconfigures the in-room media device(s) 106 of the particular guest room 102 to indicate the increased credit.

At step 212, the media system controller 108 checks whether an order of a pay-per-use media function has been received for the particular room 102. For example, the guest staying in room #101 may order a VOD movie by selecting one of the available movies 504, 506, 508 on the UI screen 500 illustrated in FIG. 5. Upon selection of a movie 504, 506, 508, the STB then sends an order message to the media system controller 108 via the media network 110. When a new order of the pay-per-use media function for the particular guest room 102 has been received, control proceeds to step 214; otherwise, control proceeds to step 224.

At step 214, in response to the received order, the media system controller 108 decreases the credit associated with the particular guest room 102 according to the amount of the credit that was utilized toward the received order. In one configuration, the credit associated with the particular guest room 102 is decreased by exactly the amount of credit that was utilized toward the order. For example, when the received order correspond to the action movie 504 of FIG. 5, the credit associated with room #101 is deceased by $7.99 so the room is left with $0.00. Similarly, when the received order corresponds to the children's movie 506, the credit associated with room #101 is decreased by $6.99 so the room is left with $1.00, and when the received order corresponds to the sports movie 508, the credit associated with room #101 is decreased by $5.99 so the room is left with $2.00.

In another configuration, the credit associated with the particular guest room 102 is decreased by an amount not equal to the amount of credit utilized. This may occur when the hospitality establishment 104 offers an automatic credit increase proportional to the amount the guest was billed for the order. For example, a hospitality establishment 104 may offer 20% of billed amounts back to the guest as in-room credit. In this case, if a guest utilizes a credit of $6.00 when ordering a movie having a full price of $12.00, the guest is billed for the remaining $6.00 and therefore receives 20% of this amount being a credit increase of $1.20. Rather than performing the credit decrease and credit increase in two separate operations, by taking into account the amount of credit utilized by the guest to determine the remaining portion that must be billed, the media system controller 108 determines the amount of the credit decrease in this example to be $4.80, which provides a credit of $1.20 to the particular guest room 102 in response to the received order. The same 20% credit back functionality may operate in a similar way according to other billed amounts in addition to (or instead of) VOD movie orders.

After decreasing the credit associated with the particular room 102 according to the amount of the credit utilized toward the received order, the media system controller 108 then reconfigures the media device(s) of the particular guest room 102 to indicate the decreased credit for future orders of the pay-per-use media function. The reconfiguration may be done in the same way as previously described for step 204.

At step 216, the media system controller 108 determines whether the amount of credit utilized toward the received order covers the full price of the ordered pay-per-use media function. When the credit utilized is insufficient to cover the full price, which is the case when the guest orders either the action movie 504 or the sports movie 508 in the example illustrated in FIG. 5, control proceeds to step 218. Alternatively, when the credit utilized was sufficient to cover the full price, which is the case when the guest orders the children's movie 506, control proceeds to step 220.

At step 218, because the amount of the credit utilized toward the received order is less than the price of the ordered pay-per-use media function, the media system controller 108 initiates billing of the guest by applying a billing amount equal to the price minus the amount of credit utilized. For example, when the guest orders the action movie 504 illustrated in FIG. 5, billing may be initiated by sending a room charge post message for room #101 from the media system controller 108 to the PMS 114 in the amount of $4.96. Likewise, when the guest orders the sports movie 508 illustrated in FIG. 5, billing may be initiated by sending a room charge post message for room #101 from the media system controller 108 to the PMS 114 in the amount of $6.00.

At step 220, the media system controller 108 documents the received order. Documenting the received order may be a requirement of the content provider 126 in order to calculate and/or confirm the required royalty payment. For example, VOD royalties are often calculated on a per playback basis as a percentage such as 50% of the actual amount charged to the guest for playback, where the minimum royalty may also be limited to be not less than a predetermined minimum such as $6.00 per playback even when 50% of the amount charged to the guest would otherwise be less.

Figure 7:
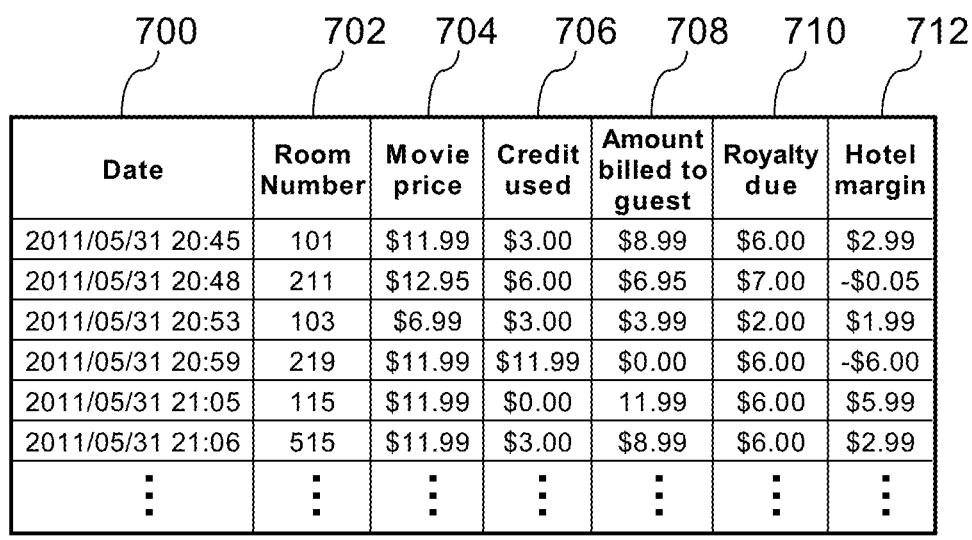
FIG. 7 is a first example of the pay-per-use history table of FIG. 1 that may be utilized for documenting pay-per-use VOD orders.

FIG. 7 is a first example of the pay-per-use history table 120 of FIG. 1 that may be utilized for documenting pay-per-use VOD orders. In this example, the credit periodically added to a guest room is built-in to the price of the guest room and the other credit increases also correspond to either additional profit or savings enjoyed by the hospitality establishment 104 when the other credit increases are applied. The columns of the pay-per-use history table 120 in this example include:

Column 700—Date: Stores the data and time that the movie was ordered.

Column 702—Room number: Stores the room ID for the particular guest room 102 that ordered the VOD movie.

Column 704—Movie price: Stores the full price of the movie.

Column 706—Credit used: Stores the amount of credit that was utilized toward the full price of the movie.

Column 708—Amount billed to guest: Stores the amount actually billed to the user (e.g., movie price minus credit used).

Column 710—Royalty due: Stores the royalty payment due to the content provider 126 each time the movie is played.

Column 712—Hotel margin: Stores the margin that the hotel made from the movie sale (e.g., amount billed to guest minus royalty due). Although negative values appear to indicate a loss, when the hospitality establishment 104 can recoup the amount of the periodic room credit (and other credits) through other means, there may be no actual loss. In other words, the hospitality establishment 104 may have already recouped the amount of the credit used in column 408 from the guest. For example, hotel room rates may be increased by $3.00 (or include a hidden $3.00 component) to account for the daily credit given to every guest. As explained above, the media system 100 may also encourage guests to make use of profit generating and cost saving measures for the hospitality establishment 104 in order to generate credit as a percentage of the additional profit and savings.

The maximum amount of credit utilized toward a received order of the pay-per-use function may also be limited to amounts other than the full price of the pay-per-use media function. An advantageous example of such limiting is illustrated with respect to the sports movie 508 shown in FIG. 5. As shown, the sports movie 508 has a required royalty of $6.00 and the maximum amount of credit that the guest can utilize toward this movie is limited such that the guest must pay the required royalty. In this way, the hospitality establishment 104 provides incentive for guests to utilize the pay-per-use media system but does not risk losing money due to covering royalty payments.

Figure 8:
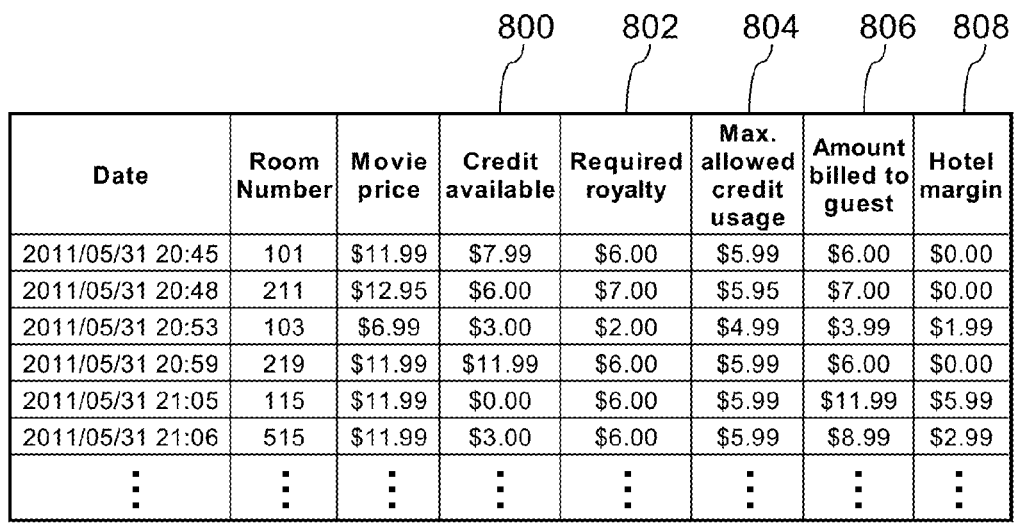
FIG. 8 is a second example of the pay-per-use history table of FIG. 1 that may be utilized for documenting pay-per-use VOD orders.

FIG. 8 is a second example of the pay-per-use history table 120 of FIG. 1 that may be utilized for documenting pay-per-use VOD orders. In this example, the maximum credit amount that can be utilized toward an order of a licensed content asset is limited such that the guest must pay the required royalty. Columns of the pay-per-use history table 120 in this example that are similar to as previously described for FIG. 7 are unlabeled and columns storing different information include:

Column 800—Credit available: Stores the amount of credit that was associated with the particular room at the time the order was made.

Column 802—Required royalty: Stores the amount of the required royalty for the media asset ordered. Similar to as column 710 of FIG. 7.

Column 804—Maximum allowed credit usage: Stores the maximum credit amount that can be utilized toward the order such that the price of the movie minus the maximum credit amount is equal to the required royalty payment specified in column 802.

Column 806—Amount billed to guest: Stores a billing amount that was applied to the guest taking into account the movie price, credit available, and max allowed credit usage. When the credit associated with the particular guest room (credit available column 800) exceeds the maximum allowed credit usage amount (column 804), the amount billed to the guest (column 806) will be equal to the required royalty payment (column 802). In other situations, the amount billed may be greater than the required royalty payment if the particular room does not have sufficient credit available.

Column 808—Hotel margin: Similar to column 712, this column stores the margin that the hotel made from the movie sale (e.g., amount billed to guest minus royalty due). As shown the example of FIG. 8, the hotel never incurs a loss. At worst, the guest pays the required royalty and at best the hotel makes a profit. Limiting the maximum allowed credit usage for media assets requiring royalties is particularly advantageous for hospitality establishments 104 that do not embed the credit into room rates or other service fees. In this way, the hospitality establishment 104 will always receive at least enough pay-per-use revenue to cover all royalty payments while still encouraging guests to try out the pay-per-use media functions in order to make use of their accumulating credit.

Continuing the description of the flowchart of FIG. 2, at step 222 the media system controller 108 activates the pay-per-use media function on one or more media devices 106 of the particular guest room 102. For example, when the received order is for a VOD movie, this step may be performed by streaming media packets to the in-room media devices 106 from the media system controller 108, an onsite (not shown) or offsite content provider 126, or another source. In other examples, the media system controller 108 may send a configuration message to an in-room media device 106 to unlock a certain feature, for example, a particular PPV TV channel on an in-room STB or PPP video game on an in-room gaming console.

At step 224, the media system controller 108 checks to see if the guest has checked out of the particular guest room 102. When the guest has checked out, control proceeds to step 226; otherwise, control returns to step 206.

At step 226, the media system controller 108 updates the guest's user profile 132 stored at the user profile server 128 with a remaining credit associated with the particular guest room when the guest checks out of the particular guest room 102. In this way, unused credit is saved on the user profile 132 and may continue accumulating when the guest later checks in to a hospitality establishment 104 belonging to the loyalty program offered by the user profile server 128.

Should the guest not belong to the loyalty program or when credit associated with the guest's room 102 is not transferable to other hospitality establishments 104 for any number of reasons, step 226 may be omitted. In another configuration, rather than storing credit on the user profile 132, the guest may be able to "cash out" by converting any remaining credit associated with their room 102 at checkout to its monetary value. This configuration is particular advantageous when the hospitality establishment 104 provides media functions allowing in-room gambling, for example.

At step 228, the media system controller 108 resets the credit associated with the particular guest room 102 because it is now vacant and reconfigures one or more of the media devices 106 of the particular guest room 102 so that they no longer indicate a credit associated with the room.

In another example configuration, the process described above for FIG. 2 may only be activated when at step 204 the guest is determined to be a member of a particular loyalty program. This loyalty program may be for an individual hospitality establishment 104 such as an individual hotel property, chain of hospitality establishments 104 such as an entire hotel chain, or even across multiple hospitality establishments such as may be offered by a media system vendor severing multiple hotel chains.

The media system controller 108 may automatically track system 100 usage, present the hospitality establishment 104 with statistics, and automatically adjust movie prices and periodic credit increases to maximize profit or minimize loss for the hospitality establishment 104.

The media system controller 108 may cap an upper limit of current credit for each guest room 102 such that a particular guest room 102 could at most accumulate $20.00 of credit, for example. The media system controller 108 may also cap the maximum amount of credit that can be used per movie (or other pay-per-use media function) on an individual basis according to a specific required royalty that must be paid to a third party. For example, maximum current credit could be limited such that at least the royalty payments are always paid for by the guest.

Another benefit of the media system 100 is that it tends to increase the use of the hospitality establishment's 140 pay-per-use media functions, which may further result in reduced royalty payments and/or cheaper overall prices or increased profit due to the hospitality establishment 140 being able to guarantee the content provider 126 larger numbers of movie views, for example.

Another benefit is that the media system 100 encourages all guests, including those that strictly refuse to pay additional in-room charges, to try out pay-per-use media functions such as watching in-room VOD movies or playing in-room PPP video games in order to make use of their accumulated credit. In configurations where there is no limit of how much credit a guest may utilize toward an order of a pay-per-use media function, over time the guest may be able to accumulate enough credit such that there is no additional billing amount applied to the guest. This increases guest satisfaction and some price sensitive users may enjoy the experience so much that they thereafter become willing to pay to order the pay-per-use media function. By using some or all of their accumulated credit, guests have flexibility to choose their own acceptable price point to order a pay-per-use media function such as watching an in-room VOD movie.

Yet another benefit of allowing guests to save unused credit in a loyalty program is to encourage guests to continually return to hospitality establishments 104 belonging to loyalty program. For guests not in the loyalty program, having credit expire upon checkout encourages the guest to either join the loyalty program or to use their credit before they checkout. Both options are mutually beneficial to the hospitality establishment 104 and the guest. Additionally, as a guest changes from a first room 102 to a second room 102 within a single hospitality establishment 104, the media system controller 108 may automatically cause the credit associated with the guest's first room 102 to "follow" the guest to the second room 102 by un-associating the credit from the first room 102 and associating it with the second room 102, and then reconfiguring media device(s) 104 in each of the first and second rooms 102 accordingly.

The media system 100 is also advantageous to groups of hospitality establishments 104 such as hotel chains in that it allows the hotels in the chain to track statistics related to individual and aggregate guests. For example, by reviewing the amount billed to guest recorded in column 708 of FIG. 7 and/or column 806 of FIG. 8, each hotel in the chain can determine the optimal acceptable price that a guest or group of guests are willing to pay for the media function. This information may then be automatically taken into account by when setting room rate prices and/or setting prices of other services offered at the hotel.

A hospitality establishment 104 on a tight budget may be concerned that if guests order credit-discounted pay-per-use media functions that the same guests would have also ordered at full price, the hospitality establishment 104 may be losing profit that it would have otherwise earned. These concerns may be solved by configuring the media system controller 108 (or another device in the media system 100) with a target profit value corresponding to average profit the hospitality establishment 104 used to make from the pay-per-use media function before activating the above process described in FIG. 2. The media system controller 108 may then monitor the average profit after activating the process described in FIG. 2 and adjust various parameters such as the periodic (e.g., daily) credit amount, pay-per-use media function prices, and times of adding the periodic credit amounts to maximize the average profit. In the event that current profits do not exceed the target profit, the controller 108 may automatically notify staff of the hospitality establishment 104 and/or deactivate the ability of guests to utilize credit associated with the rooms 102.

In an example configuration, a hospitality establishment includes guest rooms having media devices installed therein. Each guest room has one or more in-room media devices for providing a pay-per-use media function. A media system controller dynamically associates a credit corresponding to a monetary value with a particular guest room in response to an occurrence of a first event, configures an in-room media device of the particular guest room to indicate the credit associated with the particular guest room and allow a guest of the particular guest room to utilize at least an amount of the credit toward an order of the pay-per-use media function, activates the pay-per-use media function on at least one of the in-room media devices of the particular guest room in response to a received order, and decreases the credit associated with the particular guest room according to the amount of the credit utilized toward the received order.

Although the invention has been described in connection with a preferred embodiment, it should be understood that various modifications, additions and alterations may be made to the invention by one skilled in the art without departing from the spirit and scope of the invention as defined in the appended claims. For example, although the media system controller 108 is illustrated in FIG. 1 within the hospitality establishment 104, in other configurations, the media system controller 108 is positioned at another location outside the hospitality establishment 104 and accesses the media devices 106 via the Internet 130. In another example, although the credit has been illustrated as a dollar amount, other types of credit corresponding to monetary values may also be utilized. Credit may be associated with a monetary value but be represented as points, tokens, other using other currencies. In FIG. 2, the process begins at step 200 in response to a first event generally described as guest check-in to a particular room in the above examples; however, in other configurations, the first event causing the process to start at step 200 may also include any of the second events described for steps 206 and 208. In this way, the described first and second events may be interchangeably utilized in different configurations; for example, the process of FIG. 2 may start in response to a first event being a first occurrence of a periodic credit increase event (such as those described for step 206) and/or a first occurrence of another credit increase event (such as those described for step 208). Although the invention has been described as being utilized at a hotel, the invention is equally applicable to any hospitality related location or service wishing to provide users with a pay-per-use media functions including but not limited to hotels, motels, resorts, hospitals, apartment/townhouse complexes, restaurants, retirement centers, cruise ships, busses, airlines, shopping centers, passenger trains, casinos, etc. The exemplary user of "guest" is utilized in the above description because customers of hospitality establishments 104 are generally referred to as guests; however, the word "guest" in conjunction with the invention further includes all types of users of the media system 100 whether or not they are customers. The invention is also applicable to providing in-room credit for use with pay-per-use media functions outside the hospitality industry.

The various separate elements and features of the invention described above may be integrated or combined into single units. Similarly, functions of single elements and features may be separated into multiple units. The flowchart of FIG. 2 may be implemented as a process executed by dedicated hardware, and may also be implemented as one or more software programs executed by a general or specific purpose processor to cause the processor to operate pursuant to the software program to perform the above-described steps of FIG. 2. For example, the media system controller 108 of FIG. 1 may be implemented by a computer server having one or more processors 134 executing a computer program loaded from a storage media (not shown) to perform the steps of FIG. 2. In addition to a dedicated physical computing device, the word "server" may also mean a service daemon on a single computer, virtual computer, or shared physical computer, for example. Unless otherwise specified, features described may be implemented in hardware or software according to different design requirements. Additionally, all combinations and permutations of the above described features and configurations may be utilized in conjunction with the invention.

What is claimed is:

1. A system for use at a hospitality establishment having a plurality of guest rooms, the system comprising:
    a plurality of devices installed in the guest rooms wherein each guest room has one or more in-room devices for providing functions therein, the functions including at least a pay-per-use function; and
    a system controller coupled to and performing data communications with the devices and operable to:
        dynamically associate a credit corresponding to a monetary value with a particular guest room in response to a guest checking in to the particular guest room;
        dynamically increase the credit associated with the particular guest room in response to receiving a notification message indicating that a complimentary service offered at the hospitality establishment was declined for the particular guest room;
        configure an in-room device of the particular guest room to indicate the credit associated with the particular guest room and allow the guest of the particular guest room to utilize at least an amount of the credit toward an order of the pay-per-use function;
        activate the pay-per-use function on at least one of the in-room devices of the particular guest room in response to a received order; and
        decrease the credit associated with the particular guest room according to the amount of the credit utilized toward the received order.

2. The system of claim 1, wherein the complimentary service is a linen exchange.

3. The system of claim 1, wherein the complimentary service is a free meal.

4. The system of claim 1, wherein a value of the credit increase applied in response to the notification message is a percentage of the cost savings to the hospitality establishment by not providing the complimentary service declined for the particular guest room.

5. The system of claim 1, wherein the system controller is coupled to a property management system (PMS) of the hospitality establishment and the notification message is received from the PMS.

6. The system of claim 1, wherein the system controller is further operable to:
    retrieve a user profile stored at a user profile server, the user profile corresponding to the guest and having a stored credit value; and
    dynamically associate at least the stored credit value with the particular guest room when the guest checks in to the particular guest room.

7. The system of claim 6, wherein the system controller is further operable to update the user profile stored at the user profile server with a remaining credit associated with the particular guest room when the guest checks out of the particular guest room.

8. The system of claim 1, wherein:
    the guest is not a member of a loyalty program associated with the hospitality establishment when the guest checks in to the particular guest room; and
    the system controller is further operable to update a user profile at a user profile server with a remaining credit associated with the particular guest room when the guest checks out of the particular guest room, the user profile corresponding to the guest as a result of the guest joining the loyalty program before checking out of the particular guest room, whereby the guest is enabled to save the remaining credit associated with the particular guest room by joining the loyalty program.

9. A method of controlling a plurality of devices at a hospitality establishment having a plurality of guest rooms, each guest room having one or more in-room devices for providing functions therein, the functions including at least a pay-per-use function, the method comprising:
    dynamically associating a credit corresponding to a monetary value with a particular guest room in response to a guest checking in to the particular guest room;
    dynamically increasing the credit associated with the particular guest room in response to receiving a notification message indicating that a complimentary service offered at the hospitality establishment was declined for the particular guest room;
    configuring an in-room device of the particular guest room to indicate the credit associated with the particular guest room;
    allowing the guest of the particular guest room to utilize at least an amount of the credit toward an order of the pay-per-use function;
    activating the pay-per-use function on at least one of the in-room devices of the particular guest room in response to a received order; and decreasing the credit associated with the particular guest room according to the amount of the credit utilized toward the received order.

10. The method of claim 9, wherein the complimentary service is a linen exchange.

11. The method of claim 9, wherein the complimentary service is a free meal.

12. The method of claim 9, wherein a value of the credit increase applied in response to the notification message is a percentage of the cost savings to the hospitality establishment by not providing the complimentary service declined for the particular guest room.

13. The method of claim 9, further comprising:
retrieving a user profile stored at a user profile server, the user profile corresponding to the guest and having a stored credit value;
dynamically associating at least the stored credit value with the particular guest room when the guest checks in to the particular guest room; and
updating the user profile stored at the user profile server with a remaining credit associated with the particular guest room when the guest checks out of the particular guest room.

14. The method of claim 9, wherein:
the guest is not a member of a loyalty program associated with the hospitality establishment when the guest checks in to the particular guest room; and
the method further comprises updating a user profile at a user profile server with a remaining credit associated with the particular guest room when the guest checks out of the particular guest room, the user profile corresponding to the guest as a result of the guest joining the loyalty program before checking out of the particular guest room, whereby the guest is enabled to save the remaining credit associated with the particular guest room by joining the loyalty program.

15. A non-transitory computer-readable medium comprising computer executable instructions that when executed by a computer cause the computer to perform the method of claim 9.

16. A system controller for controlling a plurality of devices at a hospitality establishment having a plurality of guest rooms, each guest room having one or more in-room devices for providing functions therein, the functions including at least a pay-per-use function, the system controller comprising one or more processors configured to:
dynamically associate a credit corresponding to a monetary value with a particular guest room in response to a guest checking in to the particular guest room;
dynamically increase the credit associated with the particular guest room in response to receiving a notification message indicating that a complimentary service offered at the hospitality establishment was declined for the particular guest room;
configure an in-room device of the particular guest room to indicate the credit associated with the particular guest room;
allow the guest of the particular guest room to utilize at least an amount of the credit toward an order of the pay-per-use function;
activate the pay-per-use function on at least one of the in-room devices of the particular room in response to a received order; and
decrease the credit associated with the particular guest room according to the amount of the credit utilized toward the received order.

17. The system controller of claim 16, wherein the complimentary service is a linen exchange.

18. The system controller of claim 16, wherein the complimentary service is a free meal.

19. The system controller of claim 16, wherein a value of the credit increase applied in response to the notification message is a percentage of the cost savings to the hospitality establishment by not providing the complimentary service declined for the particular guest room.

20. The system controller of claim 16, wherein:
the guest is not a member of a loyalty program associated with the hospitality establishment when the guest checks in to the particular guest room; and
the one or more processors are further configured to update a user profile at a user profile server with a remaining credit associated with the particular guest room when the guest checks out of the particular guest room, the user profile corresponding to the guest as a result of the guest joining the loyalty program before checking out of the particular guest room, whereby the guest is enabled to save the remaining credit associated with the particular guest room by joining the loyalty program.

* * * * *